(12) United States Patent
Oh et al.

(10) Patent No.: US 10,396,670 B1
(45) Date of Patent: Aug. 27, 2019

(54) DEVICE AND METHOD FOR CONTROLLING POWER SUPPLY WITH CORRECTION BEHAVIOUR IN A POWER CIRCUIT

(71) Applicants: Sanken Electric Co., Ltd., Saitama (JP); Sanken Electric Korea Co., Ltd., Seoul (KR)

(72) Inventors: Jung Eun Oh, Seoul (KR); Mi Yong Kim, Seoul (KR); Eun Suk Lee, Seoul (KR); Masaaki Shimada, Seoul (KR); Tetsuya Tabata, Saitama (JP); Hiroaki Nakamura, Saitama (JP)

(73) Assignees: Sanken Electric Co., Ltd., Saitama (JP); Sanken Electric Korea Co., Ltd., Seoul (KR)

( * ) Notice: Subject to any disclaimer, the term of this patent is extended or adjusted under 35 U.S.C. 154(b) by 12 days.

(21) Appl. No.: 15/928,164

(22) Filed: Mar. 22, 2018

(51) Int. Cl.
*H02M 1/00* (2006.01)
*H02M 1/08* (2006.01)
*H02M 3/335* (2006.01)

(52) U.S. Cl.
CPC ......... *H02M 3/33507* (2013.01); *H02M 1/08* (2013.01); *H02M 2001/0009* (2013.01); *H02M 2001/0025* (2013.01)

(58) Field of Classification Search
CPC ..................................................... H02M 3/335
See application file for complete search history.

(56) References Cited

U.S. PATENT DOCUMENTS

2010/0148740 A1* 6/2010 Saitoh ................. H02M 3/1582
323/283
2018/0102709 A1* 4/2018 Hari ....................... H02M 3/158

\* cited by examiner

*Primary Examiner* — Jue Zhang
*Assistant Examiner* — Trinh Q Dang
(74) *Attorney, Agent, or Firm* — Harness, Dickey & Pierce, P.L.C.

(57) ABSTRACT

A device and method for controlling a power supply. The method includes: a first correction signal is generated according to a down-slope waveform and a second correction signal is generated according to an up-slope waveform, in a period of the switching element. Therefore, two kinds of corrections can be performed by using an oscillator, while the area of the circuit can be reduced and the cost of the integrated circuit can be decreased.

20 Claims, 11 Drawing Sheets

DEVICE AND METHOD FOR CONTROLLING POWER SUPPLY WITH CORRECTION BEHAVIOUR IN A POWER CIRCUIT

TECHNICAL FIELD

Embodiments of the present disclosure generally relate to the field of power supply, and more particularly, to a device and method for controlling a power supply with correction behavior in a power circuit.

BACKGROUND

A power supply that is often used in telecommunications, transportation, industry and other applications may require electrical isolation between an input and an output of the power supply. A transformer with a primary winding and a secondary winding is often used to provide this isolation. Furthermore, the power supply may further include a switching element and a rectifying diode connected to the secondary winding.

FIG. 1 is a diagram which shows a schematic illustration of a power supply and a device for controlling the power supply in the prior art. As shown in FIG. 1, a power supply 100 is used to convert a first voltage (Vin, such as a direct current voltage or direct voltage) into a second voltage (Vo, such as a direct current voltage or direct voltage). The power supply 100 may include a switching element 101, a transformer 102 with a primary winding 1021 and a secondary winding 1022, a rectifying diode 103 connected to the secondary winding 1022.

As shown in FIG. 1, a device 110 for controlling the power supply 100 may include a source voltage terminal 111 (for example it is referred to as VCC), a feedback terminal 112 (for example it is referred to as FB), and a driving terminal 113 (for example it is referred to as DRV) for driving the switching element 101. An on/off operation of the switching element 101 may be controlled by a driving signal from the driving terminal 113 with a pulse width modulation (PWM). Furthermore, COMP denotes a comparing terminal.

As shown in FIG. 1, the device 110 may further include an oscillator 114 configured to output a ramp signal into a driving circuit 115. Furthermore, as shown in FIG. 1, a current signal from an OCP (over current protection) terminal 116 may be compared with a current reference signal (for example it is referred to as REF1) in a first comparator 117. Therefore, a first controlling signal may be outputted from the first comparator 117 into the driving circuit 115; a current being conducted (or may be referred to as passed though or flowed through) in the switching element 101 can be constrained when it is overloaded, such that the switching element 101 can be protected.

As shown in FIG. 1, the feedback terminal 112 may be inputted a feedback signal (such as from a side of the secondary winding 1022). The feedback signal may be compared with a reference signal (for example it is referred to as REF2) in an error amplifier 118, and the compared signals generates a compensating error signal. The compensating error signal outputted from the error amplifier 118 may be compared with the current signal from the OCP terminal 116 in a second comparator 119. Therefore, a second controlling signal may be outputted from the second comparator 119 into the driving circuit 115.

This section introduces aspects that may facilitate a better understanding of the disclosure. Accordingly, the statements of this section are to be read in this light and are not to be understood as admissions about what is in the prior art or what is not in the prior art.

SUMMARY

However, the inventor found that the current signal from the switching element may be distorted because of propagation delay; such as a detected current is increased since propagation delay time is existed in an OCP circuit. Therefore, the current signal need to be corrected, it may be referred to as a first correction or an input correction.

Furthermore, a sub-harmonic oscillation may be occurred in the device, such as when a continuous conduction mode (CCM) is adopted and a duty of a PWM signal (that is the driving signal) is over 50%. Therefore, the sub-harmonic oscillation need to be corrected, it may be referred to as a second correction or a ramp correction.

Moreover, the first correction and the second correction may respectively be performed in different circuits. Therefore, an area of the device is relatively large and it is difficult to decrease cost of an integrated circuit including the device for controlling the power supply.

In order to solve at least part of the above problems, methods, apparatus, devices are provided in the present disclosure. Features and advantages of embodiments of the present disclosure will also be understood from the following description of specific embodiments when read in conjunction with the accompanying drawings, which illustrate, by way of example, the principles of embodiments of the present disclosure.

In general, embodiments of the present disclosure provide a device and method for controlling a power supply. It is expected to generate a first correction signal and a second correction signal by using an oscillator.

In a first aspect, a device for controlling a power supply is provided. The power supply includes a switching element, and a transformer with a primary winding and a secondary winding; and the device includes: a current detecting circuit configured to detect a current being conducted in the switching element to generate a detected signal; an oscillator configured to generate at least a down-slope waveform and an up-slope waveform in a period of the switching element; a signal generating circuit configured to generate a first slope signal based on the down-slope waveform and a second slope signal based on the up-slope waveform; and a signal superimposing circuit configured to superimpose the first slope signal on the detected signal to generate a first correction signal and superimpose the second slope signal on the detect signal to generate a second correction signal.

In one embodiment, the first correction signal is used for correcting a distorted signal caused by propagation delay of the device.

In one embodiment, the device further includes: a first comparing circuit configured to compare the first correction signal and a current reference signal to output a first controlling signal for controlling the switching element.

In one embodiment, the second correction signal is used for correcting a sub-harmonic oscillation of the device.

In one embodiment, the device further includes: a second comparing circuit configured to compare the second correction signal and an error signal from an error amplifier circuit to output a second controlling signal for controlling the switching element.

In one embodiment, the down-slope waveform and the up-slope waveform are generated in at least two periods of the oscillator, and the at least two periods of the oscillator are allocated in the period of the switching element.

In one embodiment, a correction period and/or a correction quantity of the first correction signal are/is determined based on slope and/or duration of the down-slope waveform.

In one embodiment, a correction period and/or a correction quantity of the second correction signal are/is determined based on slope and/or duration of the up-slope waveform.

In one embodiment, the first correction signal is generated before generating the second correction signal in the period of the switching element.

In one embodiment, a current mode with pulse width modulation is used in the device, and the device is configured to control the detected signal based on a feedback signal.

In a second aspect, an integrated circuit is provided. The integrated circuit includes a device for controlling a power supply as illustrated in the first aspect.

In a third aspect, a method for controlling a power supply is provided. The method includes: detecting a current being conducted in a switching element to generate a detected signal; generating at least a down-slope waveform and an up-slope waveform in a period of the switching element; generating a first slope signal based on the down-slope waveform and a second slope signal based on the up-slope waveform; and superimposing the first slope signal on the detected signal to generate a first correction signal and superimposing the second slope signal on the detect signal to generate a second correction signal.

In an embodiment, the method further includes: comparing the first correction signal and a current reference signal to output a first controlling signal for controlling the switching element.

In an embodiment, the method further includes: comparing the second correction signal and an error signal to output a second controlling signal for controlling the switching element.

According to various embodiments of the present disclosure, a first correction signal is generated according to a down-slope waveform and a second correction signal is generated according to an up-slope waveform, in a period of the switching element. Therefore, two kinds of corrections can be performed by using an oscillator, while the area of the circuit can be reduced and the cost of the integrated circuit can be decreased.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be described with reference to several example embodiments. It should be understood that these embodiments are discussed only for the purpose of enabling those skilled persons in the art to better understand and thus implement the present disclosure, rather than suggesting any limitations on the scope of the present disclosure.

It should be understood that when an element is referred to as being "connected" or "coupled" or "contacted" to another element, it may be directly connected or coupled or contacted to the other element or intervening elements may be present. In contrast, when an element is referred to as being "directly connected" or "directly coupled" or "directly contacted" to another element, there are no intervening elements present. Other words used to describe the relationship between elements should be interpreted in a like fashion (e.g., "between" versus "directly between", "adjacent" versus "directly adjacent", etc.).

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof.

The term "based on" is to be read as "based at least in part on". The term "cover" is to be read as "at least in part cover". The term "one embodiment" and "an embodiment" are to be read as "at least one embodiment". The term "another embodiment" is to be read as "at least one other embodiment". Other definitions, explicit and implicit, may be included below.

In this disclosure, unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
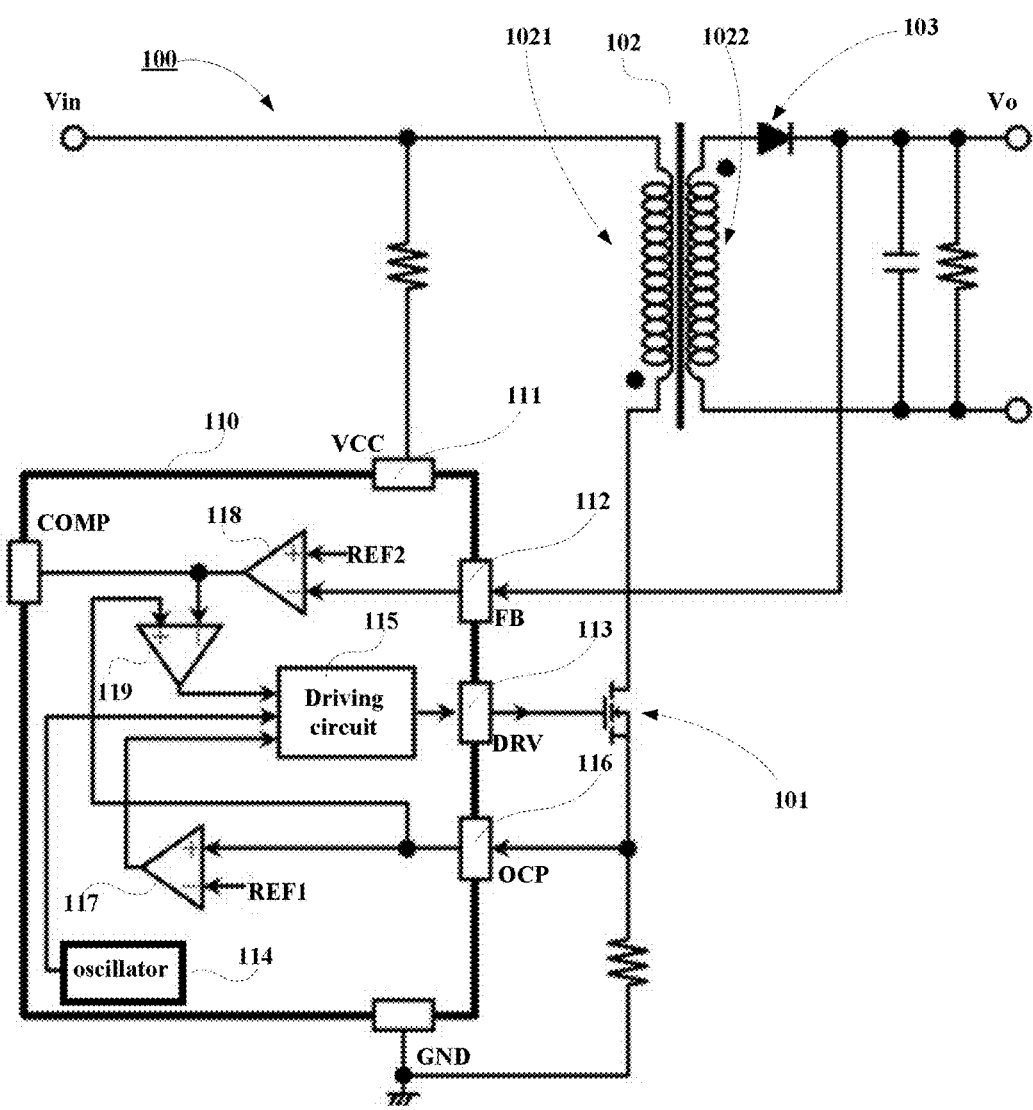
FIG. 1 is a diagram which shows a schematic illustration of a power supply and a device for controlling the power supply in the prior art.
Figure 2:
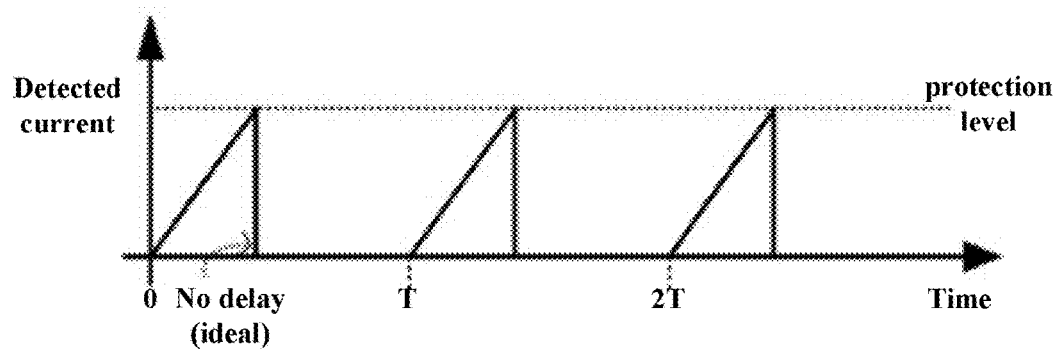
FIG. 2 is a diagram which shows an example of a current signal when the propagation delay is not existed in accordance with an embodiment of the present disclosure.
Figure 3:
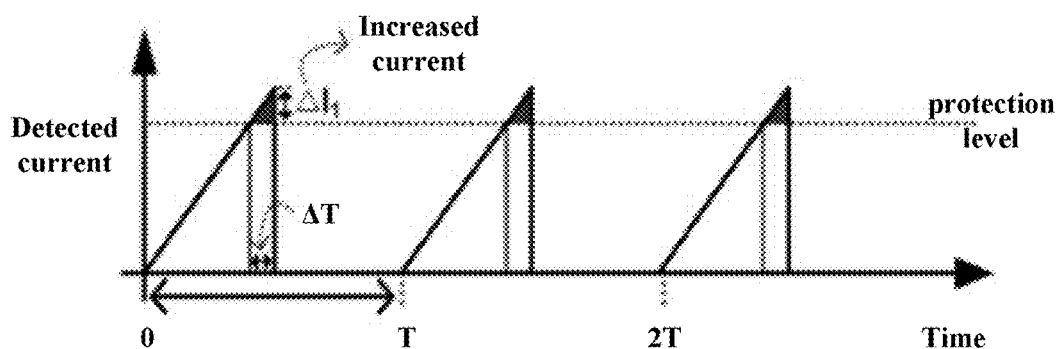
FIG. 3 is a diagram which shows an example of the current signal when the propagation delay is existed in accordance with an embodiment of the present disclosure.

FIG. 2 is a diagram which shows an example of a current signal when the propagation delay is not existed in accordance with an embodiment of the present disclosure. FIG. 3 is a diagram which shows an example of the current signal when the propagation delay is existed in accordance with an embodiment of the present disclosure.

As shown in FIG. 2, the detected current may be constrained within a protection level in an ideal case. However, as shown in FIG. 3, there exists propagation delay time $\Delta T$ in a real circuit. The detected current is increased and there exists a distorted portion $\Delta I_1$ on the protection level because of the propagation delay time $\Delta T$.

Figure 4:
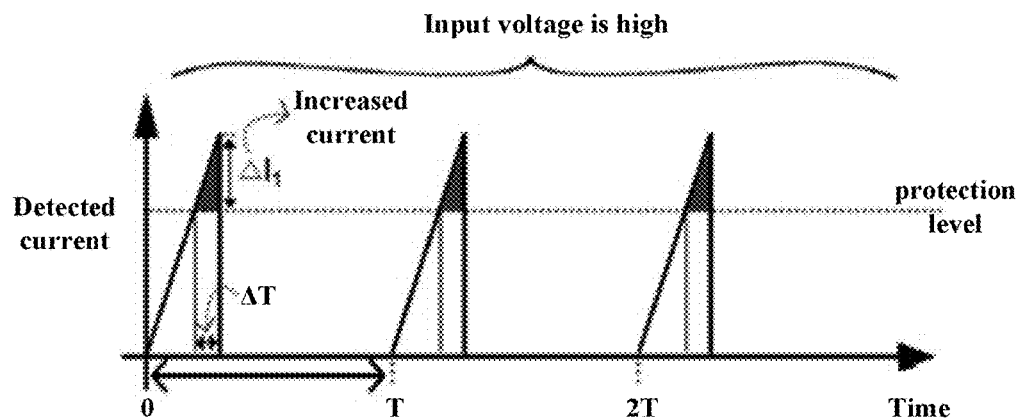
FIG. 4 is another diagram which shows an example of the current signal when the propagation delay is existed in accordance with an embodiment of the present disclosure.
Figure 5:
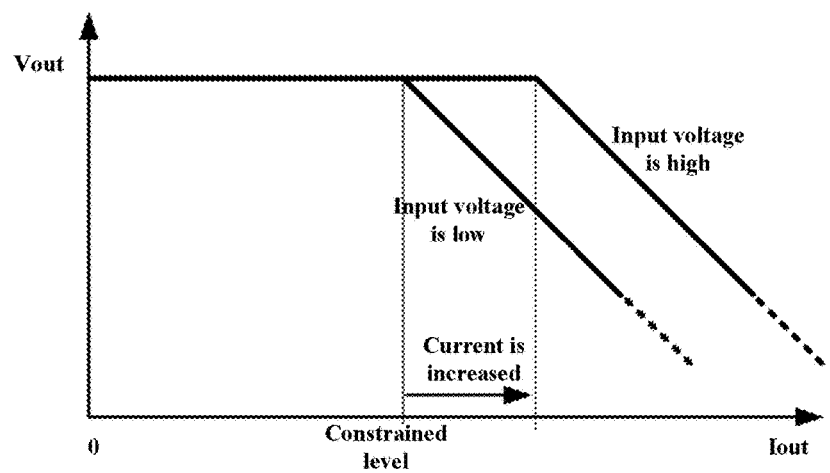
FIG. 5 is a diagram which shows an example of the current signals when an input voltage is changed in accordance with an embodiment of the present disclosure.

FIG. 4 is another diagram which shows an example of the current signal when the propagation delay is existed in accordance with an embodiment of the present disclosure. FIG. 5 is a diagram which shows an example of current signals when an input voltage is changed in accordance with an embodiment of the present disclosure.

As shown in FIG. 4, the slope of the detected current may be large when an input voltage is high, such that the current in the switching element may be increased. As shown in FIG. 5, the output current may be enlarged when the input voltage is increased.

Therefore, a first correction signal or an input correction signal is needed to correct a distorted signal $\Delta I_1$ caused by propagation delay $\Delta T$ of the device.

Figure 6:
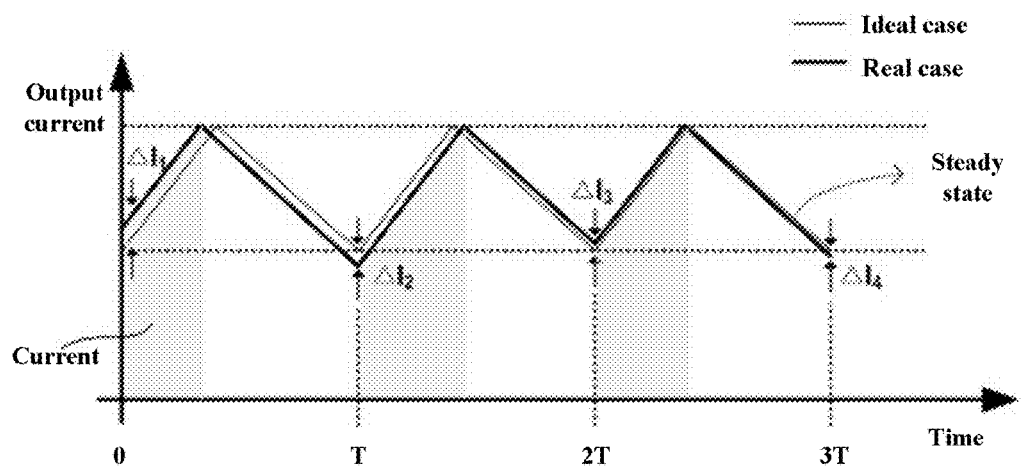
FIG. 6 is a diagram which shows an example of an output current when a duty of a PWM signal is less than 50% in accordance with an embodiment of the present disclosure.
Figure 7:
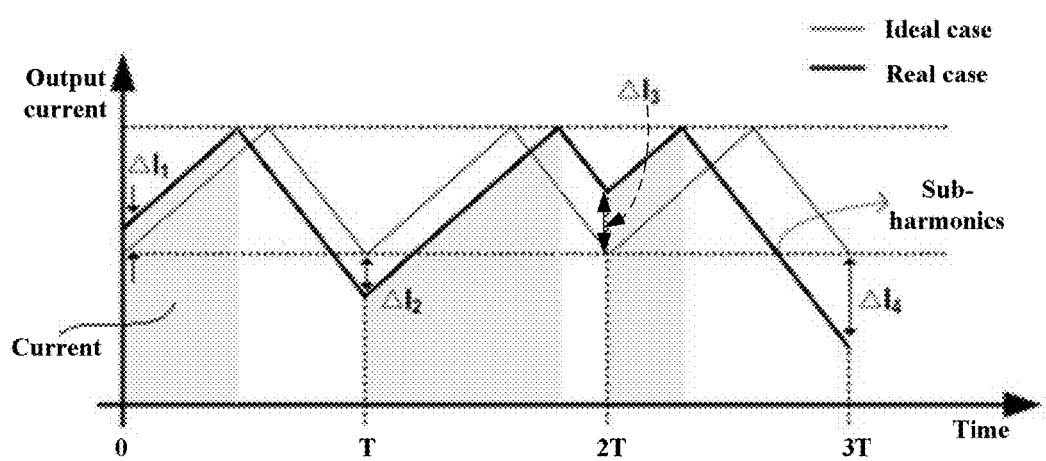
FIG. 7 is a diagram which shows an example of an output current when a duty of a PWM signal is over 50% in accordance with an embodiment of the present disclosure.

FIG. 6 is a diagram which shows an example of an output current when a duty of a PWM signal is less than 50% in accordance with an embodiment of the present disclosure. FIG. 7 is a diagram which shows an example of an output current when a duty of a PWM signal is over 50% in accordance with an embodiment of the present disclosure.

As shown in FIG. 6 and FIG. 7, compared to an ideal case, in each period (T) of the switching element, there exists a distorted portion, such as $\Delta I_1$, $\Delta I_2$, $\Delta I_3$ . . . , in a real case. Furthermore, the sub-harmonic oscillation may be occurred in the device, such as when a continuous conduction mode (CCM) is adopted and a duty of a PWM signal is over 50%.

Therefore, a second correction signal or a ramp correction signal is needed to correct a sub-harmonic oscillation of the device.

It should be appreciated that some signals or waveforms are illustrated as samples in FIGS. 2-7. However, it is not limited thereto. Furthermore, a current mode with PWM is used in the device, and the device is configured to control the detected signal based on a feedback signal. For example, the device may be a FLYBACK type, such as BUCK, BOOST, BUCK-BOOST, and so on.

A First Aspect of Embodiments

A device for controlling a power supply is provided in the embodiments.

Figure 8:
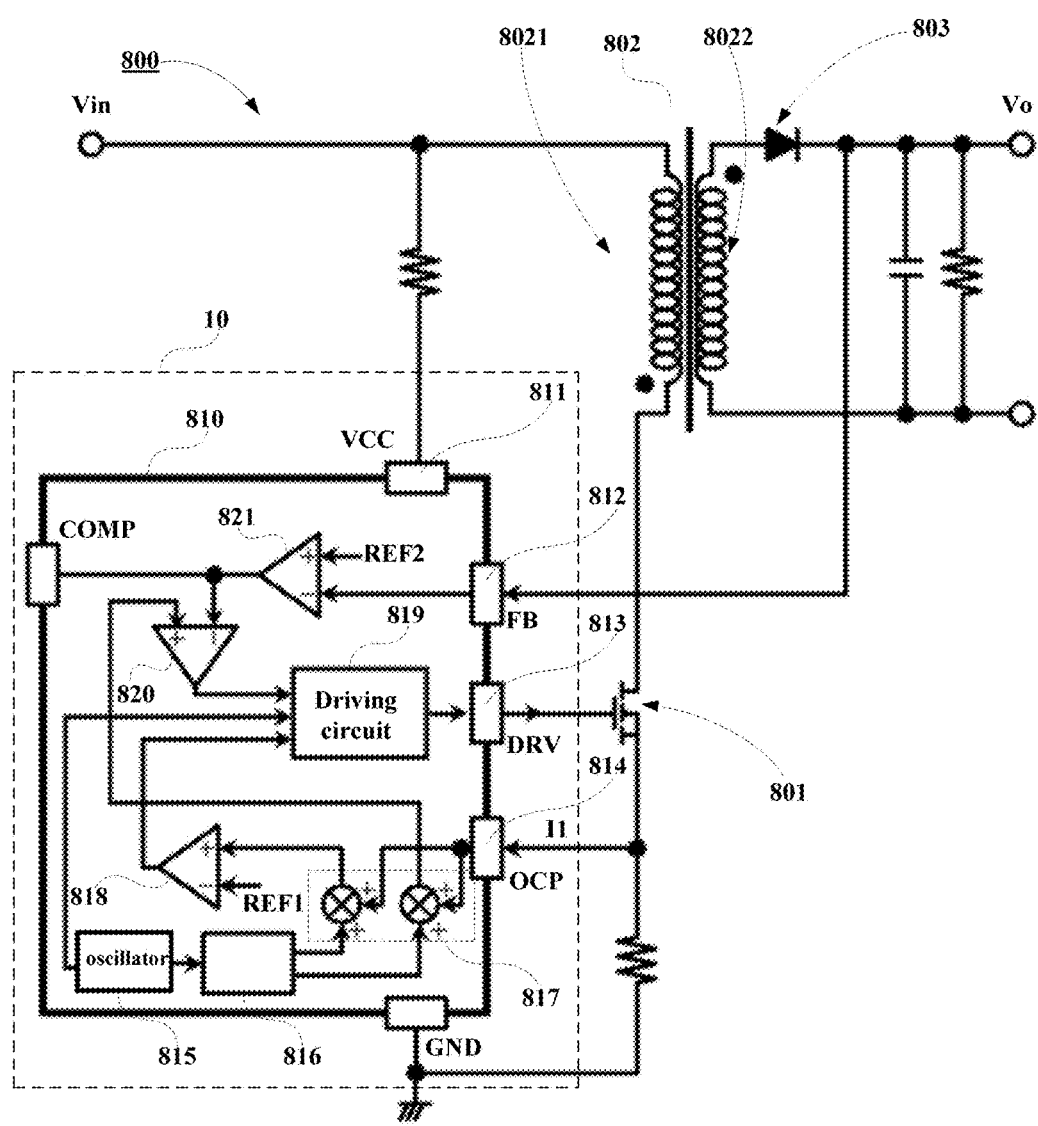
FIG. 8 is a diagram which shows a schematic illustration of a power supply 800 and a device 810 for controlling the power supply 800 in accordance with an embodiment of the present disclosure.

FIG. 8 is a diagram which shows a schematic illustration of a power supply 800 and a device 810 for controlling the power supply 800 in accordance with an embodiment of the present disclosure.

As shown in FIG. 8, the power supply 800 is used to convert a first voltage (Vin, such as a direct current voltage or direct voltage) into a second voltage (Vo, such as a direct current voltage or direct voltage). The power supply 800 may include a switching element 801, a transformer 802 with a primary winding 8021 and a secondary winding 8022, a rectifying diode 803 connected to the secondary winding 8022.

In an embodiment, the switching element 801 may be, for instance, a transistor such as an IGFET (Insulated Gate Field Effect Transistor), a MOSFET (Metal Oxide Semiconductor Field Effect Transistor) or an IGBT (Insulated Gate Bipolar Transistor), and so on. The rectifying diode 803 may be of any type of diode, for instance, it may be a Schottky diode. Numerous other types of rectifying diodes and/or switching elements may be used in addition and/or instead, and it is not limited in this disclosure.

As shown in FIG. 8, the device 810 may include a source voltage terminal 811, a feedback terminal 812, and a driving terminal 813 for driving the switching element 801. An on/off operation of the switching element 801 may be controlled by a driving signal from the driving terminal 813 with a pulse width modulation (PWM).

As shown in FIG. 8, the device 810 may further include a current detecting circuit 814 configured to detect a current I1 being conducted in the switching element 801 to generate a detected signal. For example, the current detecting circuit 814 may detect the current I1 on an OCP terminal.

As shown in FIG. 8, the device 810 may further include an oscillator 815 configured to generate at least a down-slope waveform and an up-slope waveform in a period of the switching element 801; a signal generating circuit 816 configured to generate a first slope signal based on the down-slope waveform and a second slope signal based on the up-slope waveform; and a signal superimposing circuit 817 configured to superimpose the first slope signal on the detected signal to generate a first correction signal and superimpose the second slope signal on the detect signal to generate a second correction signal.

For example, the signal generating circuit 816 may include a scaling element; a ramp signal generated in the oscillator 815 may be used to form the first slope signal and the second slop signal.

Figure 9:
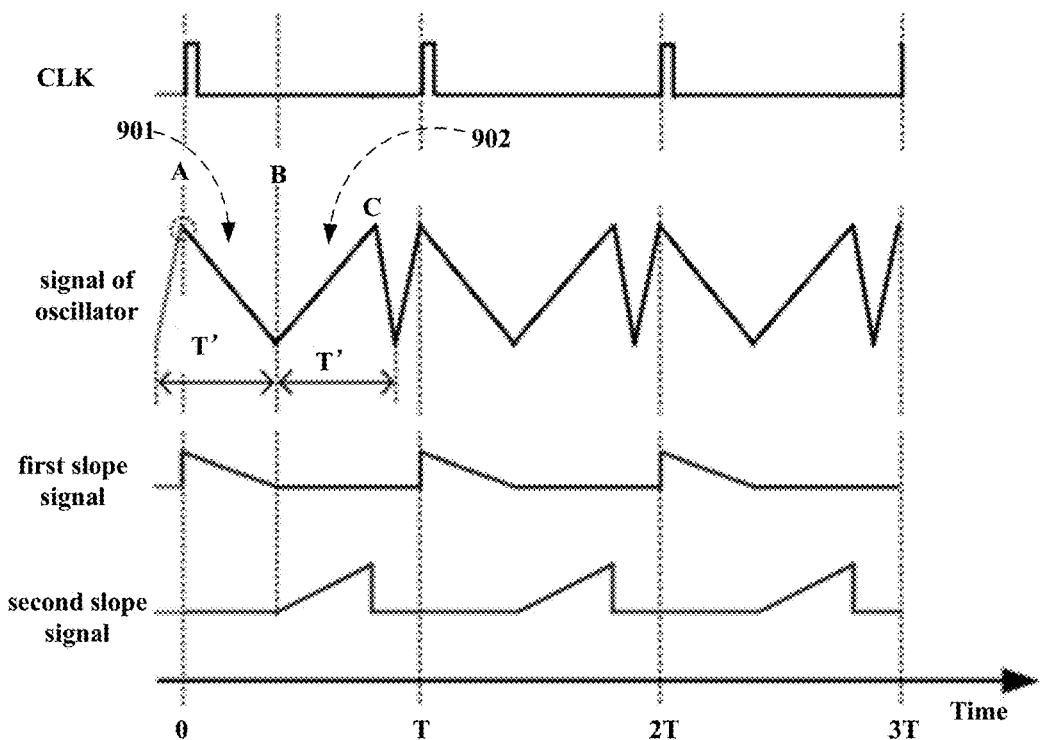
FIG. 9 is a diagram which shows the signals in one or more of elements in FIG. 8 in accordance with an embodiment of the present disclosure.

FIG. 9 is a diagram which shows the signals in one or more of elements in FIG. 8 in accordance with an embodiment of the present disclosure. As shown in FIG. 9, for example, two periods (T') of the oscillator 815 are allocated in one period (T) of the switching element 801; and a down-slope waveform 901 (for example, as shown from A to B) and an up-slope waveform 902 (for example, as shown form B to C) are generated in the two periods (T'). Furthermore, CLK denotes a clock signal.

Furthermore, as shown in FIG. 9, a first slope signal may be generated according to the down-slope waveform and a second slope signal may be generated according to the up-slope waveform.

Therefore, a first correction signal can be generated by superimposing the first slope signal on the detected signal and a second correction signal can be generated by superimposing the second slope signal on the detect signal.

In an embodiment, the first correction signal may be used for correcting a distorted signal caused by propagation delay of the device. As shown in FIG. 8, the device 810 may further include a first comparing circuit 818 configured to compare the first correction signal and a current reference signal (REF1, such as an OCP reference signal); and the first comparing circuit 818 is configured to output a first controlling signal into a driving circuit 819 for controlling the switching element 801.

In an embodiment, the second correction signal may be used for correcting a sub-harmonic oscillation of the device. As shown in FIG. 8, the device 810 may further include a second comparing circuit 820 configured to compare the second correction signal and an error signal from an error amplifier circuit 821 to output a second controlling signal into the driving circuit 819 for controlling the switching element.

Therefore, a first correction signal is generated according to a down-slope waveform and a second correction signal is generated according to an up-slope waveform, in a period of the switching element. The input correction and the ramp correction can be performed by using an oscillator, while the area of the circuit can be reduced and the cost of the integrated circuit can be decreased.

It should be appreciated that some components or elements are illustrated as samples in FIG. 8. However, it is not limited thereto, for example, connections or positions of the components or elements may be adjusted, and/or, some components or elements may be omitted.

Moreover, some components or elements not shown in FIG. 8, for example, a modulation circuit configured to generate some pulses as the driving signal to perform pulse width modulation (PWM), may be added; while components or elements shown in FIG. 8 but not explained, for example, an over current protection (OCP) circuit in FIG. 8, may be referred in the relevant art.

Figure 10:
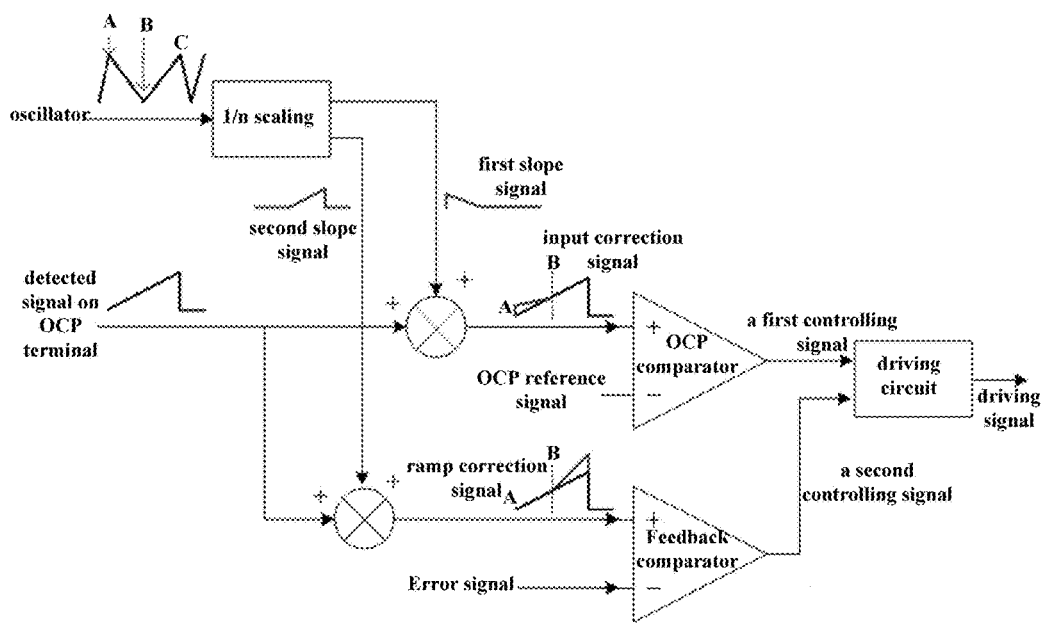
FIG. 10 is a diagram which shows some examples of the signals in accordance with an embodiment of the present disclosure.

FIG. 10 is a diagram which shows some examples of the signals in accordance with an embodiment of the present disclosure. As shown in FIG. 10, at least a down-slope waveform (for example, as shown from A to B) and an up-slope waveform (for example, as shown form B to C) are generated in the two periods (T') of the oscillator.

As shown in FIG. 10, a first slope signal may be generated according to the down-slope waveform and a second slope signal may be generated according to the up-slope waveform. Moreover, a current signal may be detected on the OCP terminal.

As shown in FIG. 10, an input correction signal can be generated by superimposing the first slope signal on the detected signal. The input correction signal may be compared with an OCP reference signal in an OCP comparator and a first controlling signal may be outputted from the OCP comparator into the driving circuit.

As shown in FIG. 10, a ramp correction signal can be generated by superimposing the second slope signal on the detect signal. The input correction signal may be compared with an error signal in a feedback comparator and a second controlling signal may be outputted from the feedback comparator into the driving circuit.

In an embodiment, the down-slope waveform and the up-slope waveform may be generated in at least two (such as an integer number N, N≥2) periods of the oscillator, and the at least two periods of the oscillator are allocated in the period of the switching element. For example, two periods of the oscillator are illustrated as examples in FIG. 9, and it is not limited thereto.

Figure 11:
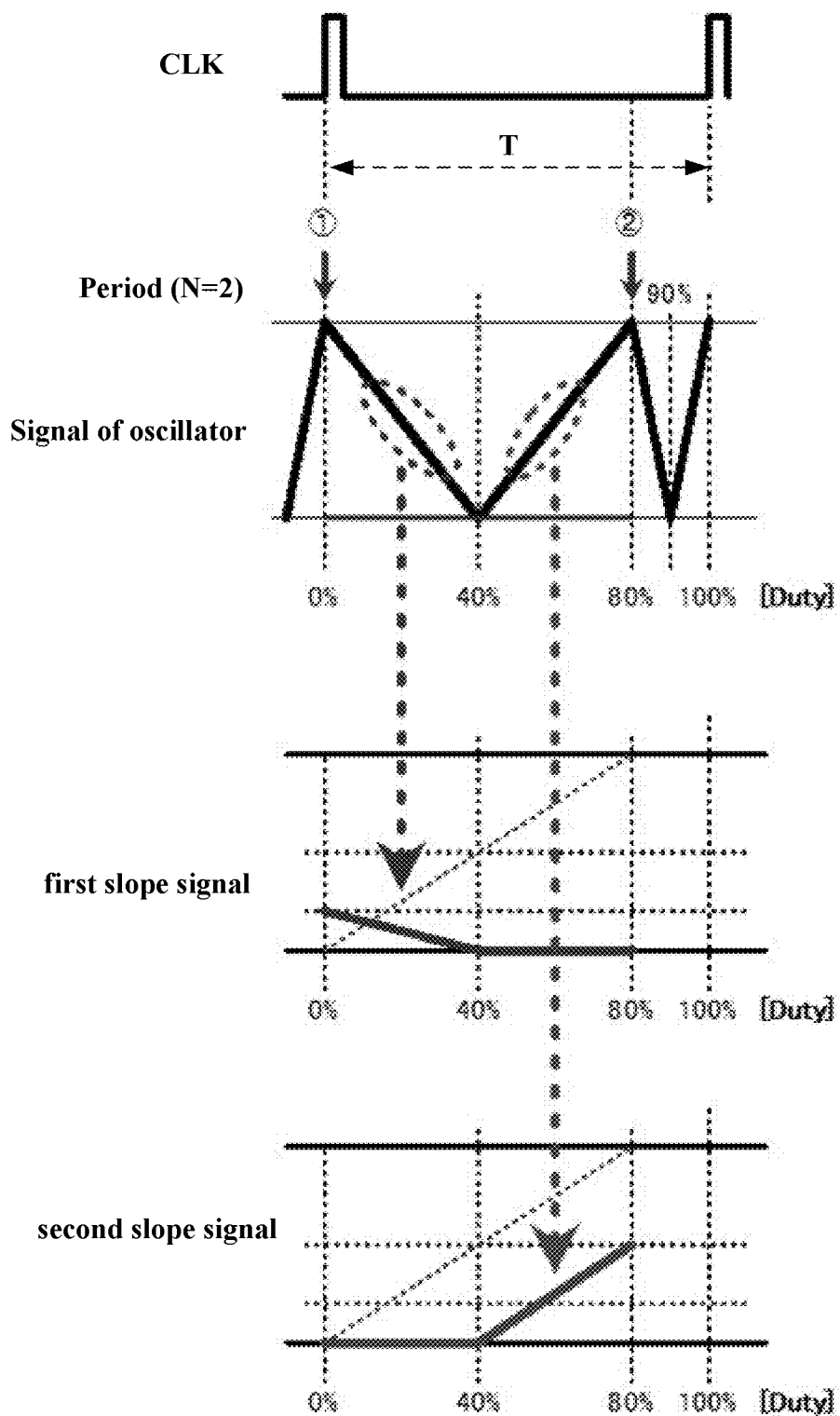
FIG. 11 is another diagram which shows some examples of the signals in accordance with an embodiment of the present disclosure.

FIG. 11 is another diagram which shows some examples of the signals in accordance with an embodiment of the present disclosure. As shown in FIG. 11, two periods (N=2) of the oscillator are used to generate the first slope signal and the second slope signal.

Figure 12:
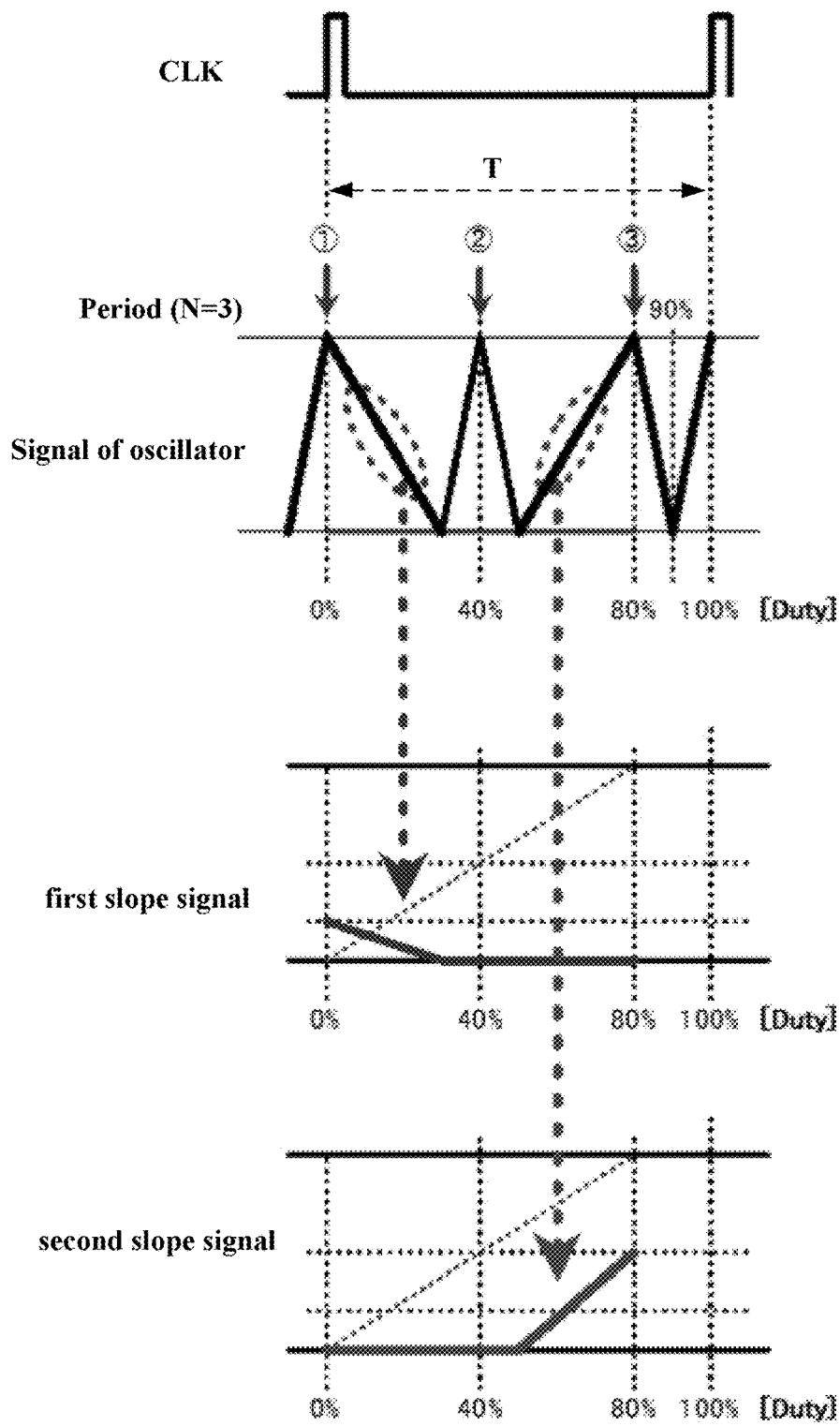
FIG. 12 is another diagram which shows some examples of the signals in accordance with an embodiment of the present disclosure.

FIG. 12 is another diagram which shows some examples of the signals in accordance with an embodiment of the present disclosure. As shown in FIG. 12, three periods (N=3) of the oscillator are used to generate the first slope signal and the second slope signal.

It should be appreciated that N=2 and N=3 are illustrated as samples in FIG. 11 and FIG. 12. However, it is not limited in this disclosure, for example, N may be greater than 3. Furthermore, the area of the circuit may be smaller when N is larger since an area of a capacitor may be smaller in a higher frequency case.

In an embodiment, the first correction signal is generated before generating the second correction signal in the period of the switching element.

In an embodiment, a correction period and/or a correction quantity of the first correction signal may be determined, based on slope and/or duration of the down-slope waveform.

In an embodiment, a correction period and/or a correction quantity of the second correction signal may be determined, based on slope and/or duration of the up-slope waveform.

Figure 13:
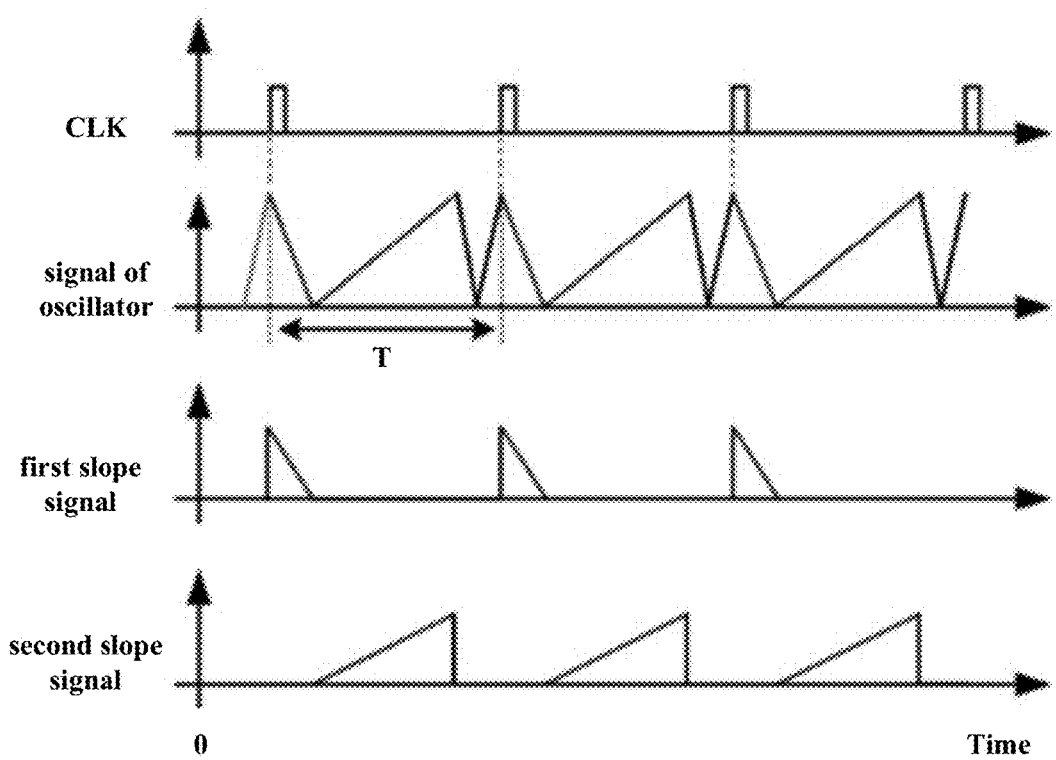
FIG. 13 is another diagram which shows some examples of the signals in accordance with an embodiment of the present disclosure.
Figure 14:
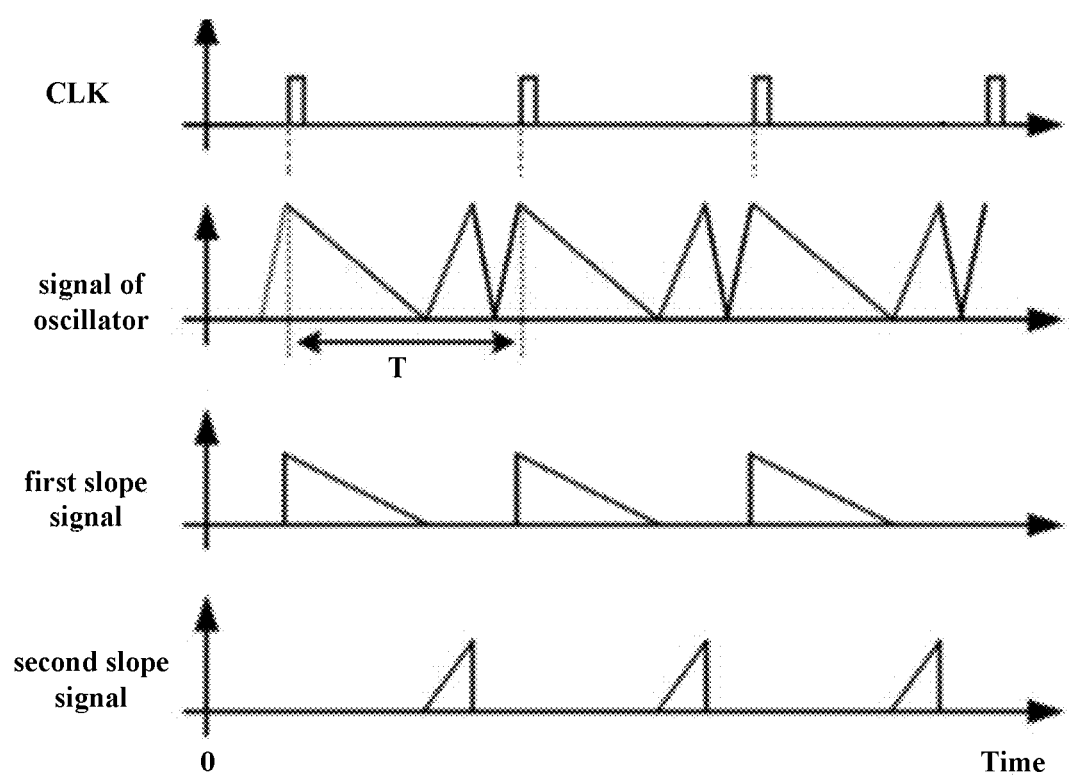
FIG. 14 is another diagram which shows some examples of the signals in accordance with an embodiment of the present disclosure.

FIG. 13 is another diagram which shows some examples of the signals in accordance with an embodiment of the present disclosure. FIG. 14 is another diagram which shows some examples of the signals in accordance with an embodiment of the present disclosure.

As shown in FIG. 13 and FIG. 14, the correction period and/or the correction quantity of the first correction signal may be changed when slope and/or duration of the down-slope waveform are/is changed. The correction period and/or the correction quantity of the second correction signal may be changed when slope and/or duration of the up-slope waveform are/is changed.

In an embodiment, a current mode with pulse width modulation is used in the device, and the device is configured to control the detected signal based on a feedback signal.

In an embodiment, as shown in FIG. 8, an integrated circuit (IC) 10 is provided. The integrated circuit 10 include a device 800 for controlling a power supply as illustrated in above.

It is to be understood that, the above examples or embodiments are discussed for illustration, rather than limitation. Those skilled in the art would appreciate that there may be many other embodiments or examples within the scope of the present disclosure.

As can be seen from the above embodiments, a first correction signal is generated according to a down-slope waveform and a second correction signal is generated according to an up-slope waveform, in a period of the switching element. Therefore, two kinds of corrections can be performed by using an oscillator, while the area of the circuit can be reduced and the cost of the integrated circuit can be decreased.

A Second Aspect of Embodiments

A method for controlling a power supply is provided in the embodiments. The corresponding device 810 and the power supply 800 are illustrated in the first aspect of embodiments, and the same contents as those in the first aspect of embodiments are omitted.

Figure 15:
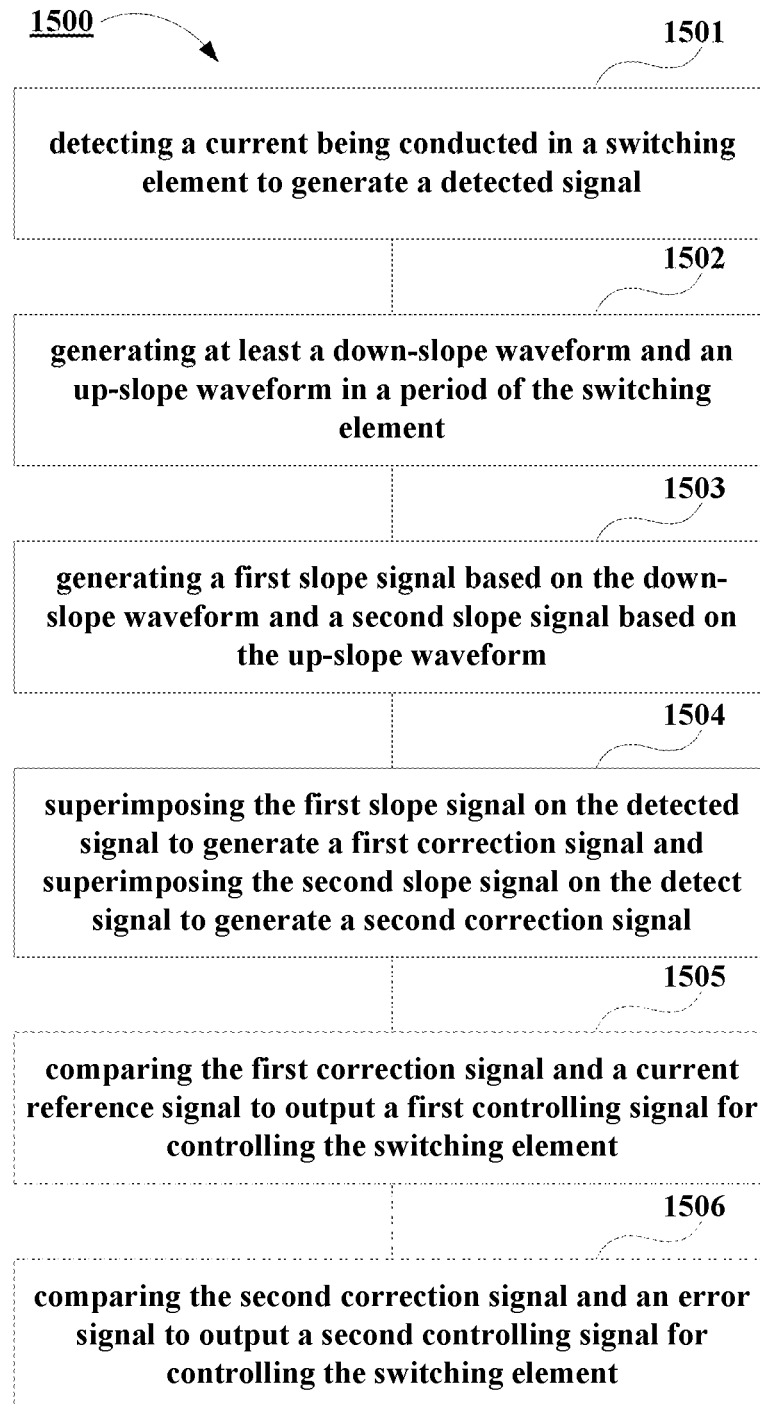
FIG. 15 is a diagram which shows a method for controlling a power supply in accordance with an embodiment of the present disclosure.

FIG. 15 is a diagram which shows a method for controlling a power supply in accordance with an embodiment of the present disclosure. As shown in FIG. 15, the method 1500 includes:

Block 1501, detecting a current being conducted in a switching element to generate a detected signal;

Block 1502, generating at least a down-slope waveform and an up-slope waveform in a period of the switching element;

Block 1503, generating a first slope signal based on the down-slope waveform and a second slope signal based on the up-slope waveform; and Block 1504, superimposing the first slope signal on the detected signal to generate a first correction signal and superimposing the second slope signal on the detect signal to generate a second correction signal.

In an embodiment, the first correction signal is used for correcting a distorted signal caused by propagation delay of the device.

As shown in FIG. 15, the method 1500 may further include:

Block 1505, comparing the first correction signal and a current reference signal to output a first controlling signal for controlling the switching element.

In an embodiment, the second correction signal is used for correcting a sub-harmonic oscillation of the device.

As shown in FIG. 15, the method 1500 may further include:

Block 1506, comparing the second correction signal and an error signal to output a second controlling signal for controlling the switching element.

It should be appreciated that FIG. 15 is only an example of the disclosure, but it is not limited thereto. For example, the order of operations at blocks may be adjusted, and/or, some blocks or steps may be omitted. Moreover, some blocks or steps not shown in FIG. 15 may be added.

In an embodiment, the down-slope waveform and the up-slope waveform are generated in at least two periods of an oscillator, and the at least two periods of the oscillator are allocated in the period of the switching element.

In an embodiment, a correction period and/or a correction quantity of the first correction signal are/is determined based on slope and/or duration of the down-slope waveform;

In an embodiment, a correction period and/or a correction quantity of the second correction signal are/is determined based on slope and/or duration of the up-slope waveform.

In an embodiment, the first correction signal is generated before generating the second correction signal in the period of the switching element.

As can be seen from the above embodiments, a first correction signal is generated according to a down-slope waveform and a second correction signal is generated according to an up-slope waveform, in a period of the switching element. Therefore, two kinds of corrections can be performed by using an oscillator, while the area of the circuit can be reduced and the cost of the integrated circuit can be decreased.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous.

Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device for controlling a power supply; the power supply comprising a switching element, and a transformer with a primary winding and a secondary winding; wherein the device comprises:
   a current detecting circuit configured to detect a current being conducted in the switching element to generate a detected signal;
   an oscillator configured to generate at least a down-slope waveform and an up-slope waveform in a switching period of the switching element, wherein at least two periods of the oscillator are allocated to the switching period of the switching element;
   a signal generating circuit configured to, during the switching period of the switching element, asynchronously generate a first slope signal based on the down-slope waveform according to the switching period of the switching element and a second slope signal based on the up-slope waveform after the first slope signal turns off; and
   a signal superimposing circuit configured to superimpose the first slope signal on the detected signal to generate a first correction signal and superimpose the second slope signal on the detect signal to generate a second correction signal.

2. The device according to claim 1, wherein the first correction signal is used for correcting a distorted signal caused by propagation delay of the device.

3. The device according to claim 1, wherein the second correction signal is used for correcting a sub-harmonic oscillation of the device.

4. The device according to claim 1, wherein the down-slope waveform and the up-slope waveform are generated in the at least two periods of the oscillator.

5. The device according to claim 1, wherein a correction period and/or a correction quantity of the first correction signal are/is determined based on slope and/or duration of the down-slope waveform.

6. The device according to claim 1, wherein a correction period and/or a correction quantity of the second correction signal are/is determined based on slope and/or duration of the up-slope waveform.

7. The device according to claim 1, wherein the first correction signal is generated before generating the second correction signal in the period of the switching element.

8. The device according to claim 1, wherein a current mode with pulse width modulation is used in the device, and the device is configured to control the detected signal based on a feedback signal.

9. An integrated circuit, comprising a device for controlling a power supply as claimed in claim 1.

10. The device according to claim 2, wherein the device further comprises:
a first comparing circuit configured to compare the first correction signal and a current reference signal to output a first controlling signal for controlling the switching element.

11. The device according to claim 3, wherein the device further comprises:
a second comparing circuit configured to compare the second correction signal and an error signal from an error amplifier circuit to output a second controlling signal for controlling the switching element.

12. A method for controlling a power supply, comprising:
detecting a current being conducted in a switching element to generate a detected signal;
generating at least a down-slope waveform and an up-slope waveform in a switching period of the switching element, wherein at least two periods of an oscillator are allocated to the switching period of the switching element;
during the switching period of the switching element, asynchronously generating a first slope signal based on the down-slope waveform according to the switching period of the switching element and a second slope signal based on the up-slope waveform after the first slope signal turns off; and
superimposing the first slope signal on the detected signal to generate a first correction signal and superimposing the second slope signal on the detect signal to generate a second correction signal.

13. The method according to claim 12, wherein the first correction signal is used for correcting a distorted signal caused by propagation delay of a device.

14. The method according to claim 12, wherein the second correction signal is used for correcting a sub-harmonic oscillation of a device.

15. The method according to claim 12, wherein the down-slope waveform and the up-slope waveform are generated in the at least two periods of an oscillator.

16. The method according to claim 12, wherein a correction period and/or a correction quantity of the first correction signal are/is determined based on slope and/or duration of the down-slope waveform.

17. The method according to claim 12, wherein a correction period and/or a correction quantity of the second correction signal are/is determined based on slope and/or duration of the up-slope waveform.

18. The method according to claim 12, wherein the first correction signal is generated before generating the second correction signal in the period of the switching element.

19. The method according to claim 13, wherein the method further comprises:
comparing the first correction signal and a current reference signal to output a first controlling signal for controlling the switching element.

20. The method according to claim 14, wherein the method further comprises:
comparing the second correction signal and an error signal to output a second controlling signal for controlling the switching element.

* * * * *